US012407988B2

(12) United States Patent
Yin et al.

(10) Patent No.: US 12,407,988 B2
(45) Date of Patent: Sep. 2, 2025

(54) SPEAKER

(71) Applicant: AAC Microtech (Changzhou) Co., Ltd., Jiangsu (CN)

(72) Inventors: Zhaoyu Yin, Changzhou (CN); Ke Li, Changzhou (CN); Wei Wei, Changzhou (CN); Zhizhu Chen, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 168 days.

(21) Appl. No.: 18/520,568

(22) Filed: Nov. 28, 2023

(65) Prior Publication Data

US 2025/0106564 A1 Mar. 27, 2025

Related U.S. Application Data

(63) Continuation of application No. PCT/CN2023/121690, filed on Sep. 26, 2023.

(51) Int. Cl.

*H04R 9/06* (2006.01)
*H04R 1/02* (2006.01)
*H04R 7/04* (2006.01)
*H04R 7/18* (2006.01)
*H04R 9/02* (2006.01)

(52) U.S. Cl.

CPC ............... *H04R 9/06* (2013.01); *H04R 1/025* (2013.01); *H04R 7/04* (2013.01); *H04R 7/18* (2013.01); *H04R 9/025* (2013.01); *H04R 2400/11* (2013.01)

(58) Field of Classification Search

CPC . H04R 9/06; H04R 1/025; H04R 7/04; H04R 7/18; H04R 9/025; H04R 2400/11; H04R 2499/11; H04R 7/20; H04R 1/023

See application file for complete search history.

(56) References Cited

U.S. PATENT DOCUMENTS 11,638,097 B1 * 4/2023 Jin ........................... H04R 7/20 381/412
2016/0241938 A1 * 8/2016 Huang ................... H04R 1/023
2025/0106563 A1 * 3/2025 Li ............................ H04R 9/06

FOREIGN PATENT DOCUMENTS

CN 216391396 U * 4/2022 ............... H04R 9/06

* cited by examiner

*Primary Examiner* — Angelica M Mckinney
(74) *Attorney, Agent, or Firm* — Wiersch Law Group

(57) ABSTRACT

The present disclosure discloses a speaker comprising a frame, a vibration system, a magnetic circuit system, and a flexible circuit board; the magnetic circuit system comprising a lower clamping plate and a main magnet; the lower clamping plate comprising a lower clamping body, four rectangular through-holes and four first flanges; a portion of the lower clamping body located on the side of the rectangular through-hole away from the main magnet is square to and fixed to the frame and abuts against the flexible circuit board; the speaker further comprising four breathable isolators fixed to the lower clamping body and covering each of the rectangular through-holes. The speaker can be used in an environment with an open cavity in the sound producing cavity, with good leakage effect, low cost and excellent acoustic performance.

10 Claims, 4 Drawing Sheets

SPEAKER

FIELD OF THE PRESENT DISCLOSURE

The present disclosure relates to electro-acoustic transducers, especially relates to a speaker for electronic speaker products.

DESCRIPTION OF RELATED ART

With the arrival of the mobile Internet era, the types of smart mobile devices are constantly being updated, and among the many types of smart mobile devices, speakers have been used as their most basic fittings.

The speaker of the related art comprises a frame, and a vibration system and a magnetic circuit system respectively fixed to the frame, and FPC fixed to the frame; the vibration system includes the diaphragm and the voice coil that drives the vibration of the diaphragm, the magnetic circuit system mainly includes the lower clamping plate and the main magnet fixed on the lower clamping plate, the lower clamping plate from the edge of the shape of the tear bending and then forming a vertical flange, the flange and the main magnet spaced to form a magnetic gap, the voice coil inserted and suspended in the magnetic gap.

However, the related art speakers due to FPC alignment and other reasons, the FPC fixed between the frame and the lower clamping plate, it will inevitably be formed after the lower clamping plate flap larger holes and can not paste the dust cover, resulting in the rear cavity of the speaker can not be closed to prevent debris, can not be used in an open rear cavity environment, while the speaker leakage can only be changed through the change of the shape of the frame and the lower clamping plate, parts of the change of the mold is time-consuming and labor-intensive, leading to the cost of too high.

Therefore, it is necessary to provide an improved speaker to overcome the problems mentioned above.

SUMMARY OF THE INVENTION

The present disclosure provides a speaker can be used in an environment with an open cavity in the sound producing cavity, with good leakage effect, low cost and excellent acoustic performance.

The speaker comprising: a frame, a vibration system, a magnetic circuit system having a magnetic gap and driving the vibration system to vibrate, and a flexible circuit board embedded in the bottom end of the frame; the vibration system and the magnetic circuit system are respectively fixed at both ends of the frame and collectively enclosed into a sound producing cavity; the vibration system includes a diaphragm fixed to the frame and a voice coil driving the diaphragm to vibrate, with the voice coil inserted in the magnetic gap; the magnetic circuit system comprises a lower clamping plate and a main magnet stacked and fixed to the lower clamping plate; wherein, the magnetic circuit system is rectangular in shape; the lower clamping plate comprising a lower clamping body, four rectangular through-holes through the lower clamping body and respectively located on surroundings sides of the main magnet, and four first flanges formed on one side of the rectangular through-holes adjacent to the main magnet and extending to the diaphragm; each first flange having a shape and size matching the corresponding rectangular through-hole; each of four first flanges spaced from the main magnet and forming the magnetic gap collectively; a portion of the lower clamping body located on the side of the rectangular through-hole away from the main magnet is square to and fixed to the frame and abuts against the flexible circuit board, and the rectangular through-hole is connected to the sound producing cavity to outside; the speaker further comprising four breathable isolators fixed to the lower clamping body and covering each of the rectangular through-holes.

Further, the four rectangular through-holes are provided in the central region of each of the lower clamping body's peripheral sides.

Further, the lower clamp body is provided with four grooves recessed inwardly and spaced apart from each other on one side away from the vibration system; the four rectangular through-holes are provided in the area of each of the four grooves, and the four breathable isolators are fixed in each of the four grooves.

Further, the lower clamping plate further comprises four second flanges formed by bending and extending the peripheral edges of the lower clamping body in the direction of toward the diaphragm respectively; each of the four second flanges extends to a side of the flexible circuit board away from the frame and against the flexible circuit board, and each of the four second flanges is spaced relative to the four first flanges to form four clamping positions; the frame is provided with four limiting portions projecting and extending in a direction proximate to the lower clamping plate, corresponding to each of the four clamping positions; each of the four limiting portions extends to and snaps into each of the four clamping positions.

Further, lower clamping plate further comprises four yielding spaces formed at positions running through its four corners respectively; the frame is provided with four support portions protruding and extending in a direction close to the lower clamping plate at positions corresponding to each of the four yielding spaces; each of the four support portions extends to each of the four yielding spaces and is fixedly connected to the lower clamping body.

Further, the magnetic circuit system further comprising a pole core superimposed and fixed to the main magnet.

Further, the diaphragm comprising a folded ring in shape of an annulus and a vibrating section formed by extension of an inner periphery of the folded ring and in shape of an annulus; an outer periphery of the folded ring being fixed to the frame, the voice coil being fixed to the side of the vibrating section near the magnetic circuit system.

Further, the vibration system further comprising an auxiliary dome fixed to an inner peripheral edge of the vibrating section; the voice coil fixed to a side of the auxiliary dome proximate to the magnetic circuit system.

Further, the speaker further comprises a cover plate fixed to the frame and enclosing the vibration system to form a front cavity, a sound outlet hole through the cover plate and a dust cover fixed to the cover plate and covering the sound outlet hole.

Further, the speaker further comprises two elastic members; the elastic members comprise a first fixing arm fixed to the frame, two second fixing arms respectively supporting and fixed to a side of the voice coil away from the diaphragm, and two elastomer arms extending from the first fixing arm to the two second fixing arms respectively and forming a fixed connection; one of the flexible members serves as the flexible circuit board, and the first fixing arm of the flexible member serving as the flexible circuit board is provided with a connection portion extending in a direction away from the second fixing arm.

Compared to related arts, the speaker of the present disclosure can meet the speaker's demand for greater leakage by embedding the flexible circuit board into the bottom end of the frame and providing four rectangular through-holes on each of the four peripheral sides of the lower clamping body, and also providing four first flanges extending in the direction close to the diaphragm on one side of the four rectangular through-holes close to the main magnet, and causing the portion of the body of the lower clamping plate located on the side of the rectangular through-holes away from the main magnet to be offset against the flexible circuit board, thus allowing the four rectangular through-holes to be set up in such a way to meet the need for greater leakage of the speaker, and also to enable the alignment position of the flexible circuit board to be shrouded to the side of the lower clamping plate close to the frame, so as to make it unnecessary to change the mold of the parts of the speaker, and thus to save time and manpower, so as to reduce the cost; at the same time, the four breathable isolators are fixed to the lower clamping body and cover the four rectangular through-holes, so that not only can make the speaker can be used in the environment of the sound produing cavity open, but also by changing the damping of the breathable isolators on the leakage of speakers for precise adjustment and control, in order to adjust the acoustic performance of the speakers in a more convenient and quicker acoustical properties, so as to make the acoustic performance of the speakers better.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
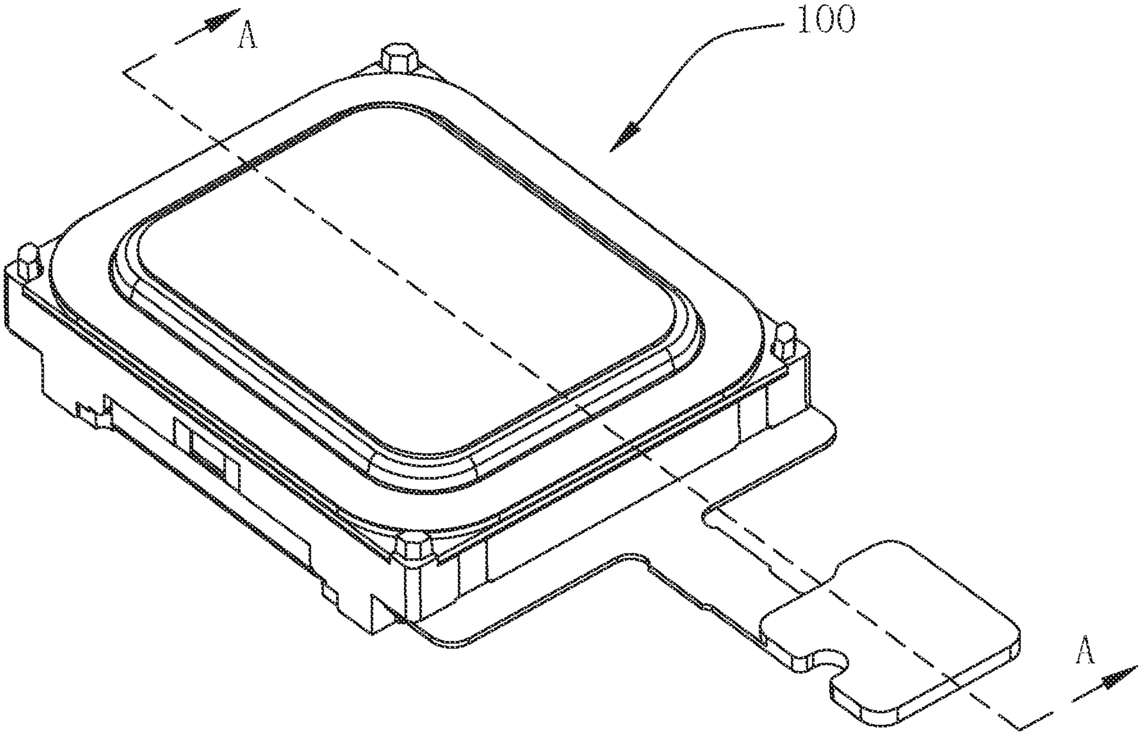
FIG. 1 is a structure schematic of a speaker of the present disclosure.
Figure 2:
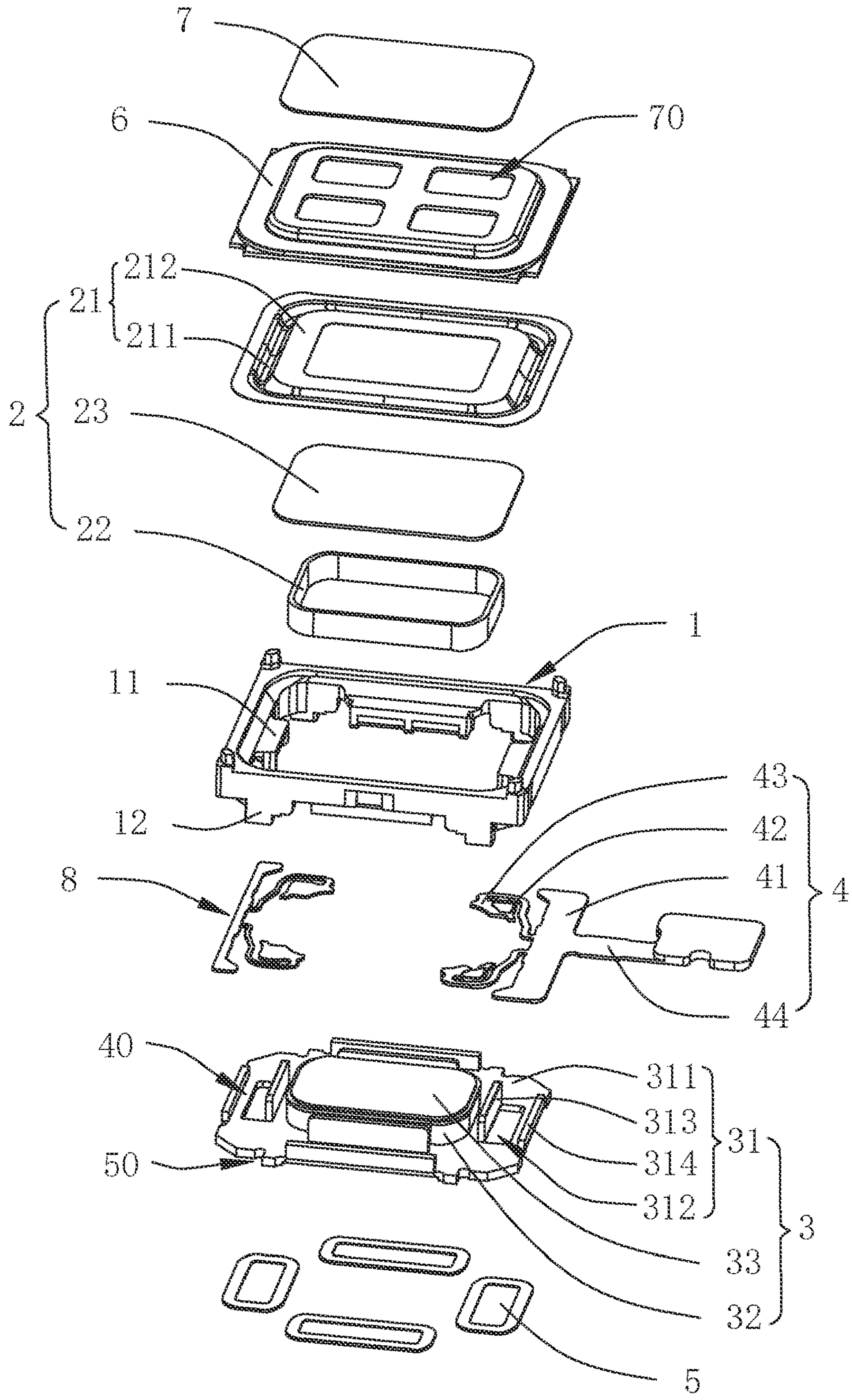
FIG. 2 is an exploded view of the speaker of the present disclosure.
Figure 3:
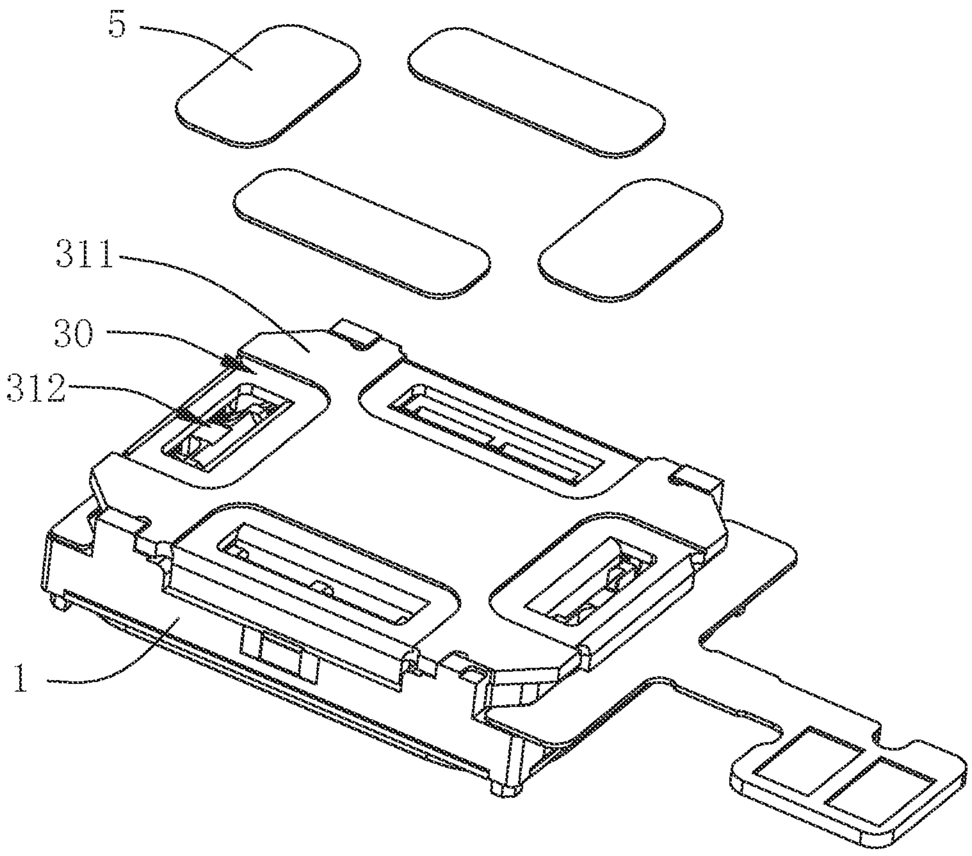
FIG. 3 is a partial exploded view of the speaker of the present disclosure.
Figure 4:
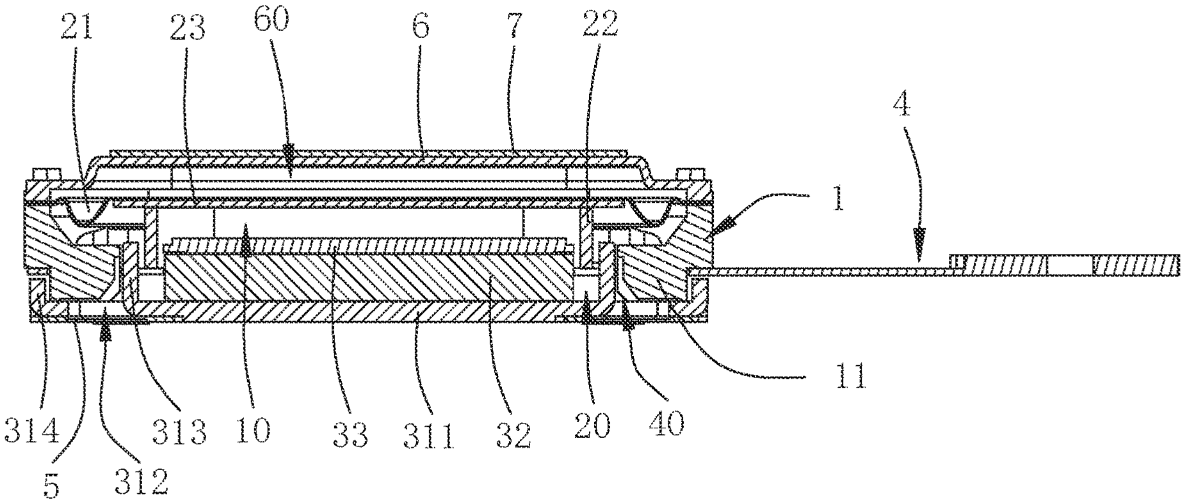
FIG. 4 is a cross-sectional view of the speaker taken along line A-A in FIG. 1.

Please refer to FIGS. 1-4 together, the present disclosure providing a speaker 100 comprising: a frame 1, a vibration system 2, a magnetic circuit system 3 having a magnetic gap 20 and driving the vibration system 2 to vibrate, and a flexible circuit board 4 embedded in the bottom end of the frame 1.

The vibration system 2 and the magnetic circuit system 3 are respectively fixed at both ends of the frame 1 and collectively enclosed into a sound producing cavity 10.

The vibration system 2 includes a diaphragm 21 fixed to the frame 2 at the outer periphery and a voice coil 22 driving the diaphragm 21 to vibrate, with the voice coil 22 inserted in the magnetic gap 20.

In the embodiment, the diaphragm 21 comprising a folded ring 211 in shape of an annulus and a vibrating section 212 formed by extension of an inner periphery of the folded ring 211 and in shape of an annulus, an outer periphery of the folded ring 211 being fixed to the frame 1, the voice coil 22 being fixed to the side of the vibrating section 212 near the magnetic circuit system 3.

The vibration system 2 further comprising an auxiliary dome 23 fixed to an inner peripheral edge of the vibration section 212, the voice coil 22 fixed to a side of the auxiliary dome 23 proximate to the magnetic circuit system 3.

Specifically, the magnetic circuit system 3 is rectangular in shape. The magnetic circuit system 3 comprises a lower clamping plate 31 and a main magnet 32 stacked and fixed to the lower clamping plate 31.

In this embodiment, the lower clamping plate 31 comprising a lower clamping body 311, four rectangular through-holes 312 through the lower clamping body 311 and respectively located on surroundings sides of the main magnet 32, and four first flanges 313 formed on one side of the rectangular through-holes 312 adjacent to the main magnet 32 and extending to the diaphragm 21; each first flange 313 having a shape and size matching the corresponding rectangular through-hole 312; each of four first flanges 313 spaced from the main magnet 32 and forming the magnetic gap 20 collectively; a portion of the lower clamping body 311 located on the side of the rectangular through-hole 312 away from the main magnet 32 is square to and fixed to the frame 1 and abuts against the flexible circuit board 4, and the rectangular through-hole 312 is connected to the sound producing cavity 10 to outside.

Four rectangular through-holes 312 are provided in the central region of each of the lower clamping body 311's peripheral sides.

The lower clamping plate 31 further comprises four second flanges 314 formed by bending and extending the peripheral edges of the lower clamping body 311 in the direction of toward the diaphragm 21 respectively; each of the four second flanges 314 extends to a side of the flexible circuit board 4 away from the frame 1 and against the flexible circuit board 4, and each of the four second flanges 314 is spaced relative to the four first flanges 313 to form four clamping positions 40; the frame 1 is provided with four limiting portions 11 projecting and extending in a direction proximate to the lower clamping plate 31, corresponding to each of the four clamping positions 40; each of the four limiting portions 11 extends to and snaps into each of the four clamping positions 40. This design allows sealing of the rectangular through-hole 312 by means of the limiting portion 11 of the frame 1.

The lower clamping plate 31 further comprises four yielding spaces 50 formed at positions running through its four corners respectively; the frame 1 is provided with four support portions 12 protruding and extending in a direction close to the lower clamping plate 31 at positions corresponding to each of the four yielding spaces 50; each of the four support portions 12 extends to each of the four yielding spaces 50 and is fixedly connected to the lower clamping body 311.

The magnetic circuit system 3 further comprising a pole core 33 superimposed and fixed to the main magnet 32.

Specifically, the speaker 100 further comprising four breathable isolators 5 fixed to the lower clamping body 311 and covering each of the rectangular through-holes 312.

In this embodiment, the lower clamp body 311 is provided with four grooves 30 recessed inwardly and spaced apart from each other on one side away from the vibration system 2; the four rectangular through-holes 312 are provided in the area of each of the four grooves 30, and the four breathable isolators 5 are fixed in each of the four grooves 30.

The speaker 100 further comprises two elastic members 8; the elastic members 8 comprise a first fixing arm 41 fixed to the frame 1, two second fixing arms 43 respectively supporting and fixed to a side of the voice coil 22 away from the diaphragm 21, and two elastomer arms 42 extending from the first fixing arm 41 to the two second fixing arms 43 respectively and forming a fixed connection;

One of the flexible members 8 serves as the flexible circuit board 4, and the first fixing arm 41 of the flexible member 8 serving as the flexible circuit board 4 is provided with a connection portion 44 extending in a direction away from the second fixing arm 43.

The flexible member 8, which is the flexible circuit board 4, is an FPC, i.e. a printed circuit board, and its second fixing arm 43 is electrically connected to the voice coil 22 for the transmission of electrical signals.

The speaker 100 further comprises a cover plate 6 fixed to the frame 1 and enclosing the vibration system 2 to form a front cavity 60, a sound outlet hole 70 through the cover plate 6.

In this embodiment, the sound outlet holes 70 include four and are all rectangular in shape. The speaker 100 further comprises a dust cover 7 fixed to the cover plate 6 and covering the sound outlet hole 70.

The speaker 100 of the present disclosure can meet the speaker's demand for greater leakage by embedding the flexible circuit board 4 into the bottom end of the frame 1 and providing four rectangular through-holes 312 on each of the four peripheral sides of the lower clamping body 311, and also providing four first flanges 313 extending in the direction close to the diaphragm 21 on one side of the four rectangular through-holes 312 close to the main magnet 32, and causing the portion of the body of the lower clamping plate 311 located on the side of the rectangular through-holes 312 away from the main magnet 32 to be offset against the flexible circuit board 4, thus allowing the four rectangular through-holes 312 to be set up in such a way to meet the need for greater leakage of the speaker, and also to enable the alignment position of the flexible circuit board 4 to be shrouded to the side of the lower clamping plate 31 close to the frame 1, so as to make it unnecessary to change the mold of the parts of the speaker 100, and thus to save time and manpower, so as to reduce the cost; at the same time, the four breathable isolators 5 are fixed to the lower clamping body 311 and cover the four rectangular through-holes 312, so that not only can make the speaker 100 can be used in the environment of the sound producing cavity 10 open, but also by changing the damping of the breathable isolators 5 on the leakage of speakers 100 for precise adjustment and control, in order to adjust the acoustic performance of the speakers 100 in a more convenient and quicker acoustical properties, so as to make the acoustic performance of the speakers 100 better.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker comprising: a frame, a vibration system, a magnetic circuit system having a magnetic gap and driving the vibration system to vibrate, and a flexible circuit board embedded in the bottom end of the frame; the vibration system and the magnetic circuit system are respectively fixed at both ends of the frame and collectively enclosed into a sound producing cavity;

the vibration system includes a diaphragm fixed to the frame and a voice coil driving the diaphragm to vibrate, with the voice coil inserted in the magnetic gap;

the magnetic circuit system comprises a lower clamping plate and a main magnet stacked and fixed to the lower clamping plate;

wherein, the magnetic circuit system is rectangular in shape; the lower clamping plate comprising a lower clamping body, four rectangular through-holes through the lower clamping body and respectively located on surroundings sides of the main magnet, and four first flanges formed on one side of the rectangular through-holes adjacent to the main magnet and extending to the diaphragm; each first flange having a shape and size matching the corresponding rectangular through-hole; each of four first flanges spaced from the main magnet and forming the magnetic gap collectively; a portion of the lower clamping body located on the side of the rectangular through-hole away from the main magnet is square to and fixed to the frame and abuts against the flexible circuit board, and the rectangular through-hole is connected to the sound producing cavity to outside;

the speaker further comprising four breathable isolators fixed to the lower clamping body and covering each of the rectangular through-holes.

2. The speaker as described in claim 1, wherein the four rectangular through-holes are provided in the central region of each of the lower clamping body's peripheral sides.

3. The speaker as described in claim 1, wherein the lower clamp body is provided with four grooves recessed inwardly and spaced apart from each other on one side away from the vibration system; the four rectangular through-holes are provided in the area of each of the four grooves, and the four breathable isolators are fixed in each of the four grooves.

4. The speaker as described in claim 1, wherein the lower clamping plate further comprises four second flanges formed by bending and extending the peripheral edges of the lower clamping body in the direction of toward the diaphragm respectively; each of the four second flanges extends to a side of the flexible circuit board away from the frame and against the flexible circuit board, and each of the four second flanges is spaced relative to the four first flanges to form four clamping positions; the frame is provided with four limiting portions projecting and extending in a direction proximate to the lower clamping plate, corresponding to each of the four clamping positions; each of the four limiting portions extends to and snaps into each of the four clamping positions.

5. The speaker as described in claim 4, wherein the lower clamping plate further comprises four yielding spaces formed at positions running through its four corners respectively; the frame is provided with four support portions protruding and extending in a direction close to the lower clamping plate at positions corresponding to each of the four yielding spaces; each of the four support portions extends to each of the four yielding spaces and is fixedly connected to the lower clamping body.

6. The speaker as described in claim 1, wherein the magnetic circuit system further comprising a pole core superimposed and fixed to the main magnet.

7. The speaker as described in claim 1, wherein the diaphragm comprising a folded ring in shape of an annulus and a vibrating section formed by extension of an inner periphery of the folded ring and in shape of an annulus; an outer periphery of the folded ring being fixed to the frame, the voice coil being fixed to the side of the vibrating section near the magnetic circuit system.

8. The speaker as described in claim 7, wherein the vibration system further comprising an auxiliary dome fixed to an inner peripheral edge of the vibrating section; the voice coil fixed to a side of the auxiliary dome proximate to the magnetic circuit system.

9. The speaker as described in claim 1, wherein the speaker further comprises a cover plate fixed to the frame and enclosing the vibration system to form a front cavity, a sound outlet hole through the cover plate and a dust cover fixed to the cover plate and covering the sound outlet hole.

10. The speaker as described in claim 1, wherein the speaker further comprises two elastic members; the elastic members comprise a first fixing arm fixed to the frame, two second fixing arms respectively supporting and fixed to a side of the voice coil away from the diaphragm, and two elastomer arms extending from the first fixing arm to the two second fixing arms respectively and forming a fixed connection; one of the flexible members serves as the flexible circuit board, and the first fixing arm of the flexible member serving as the flexible circuit board is provided with a connection portion extending in a direction away from the second fixing arm.

* * * * *